May 25, 1954
R. H. TERHUNE
2,679,250
STACKING DEVICE FOR PILING FARM CROPS
Filed Aug. 1, 1952
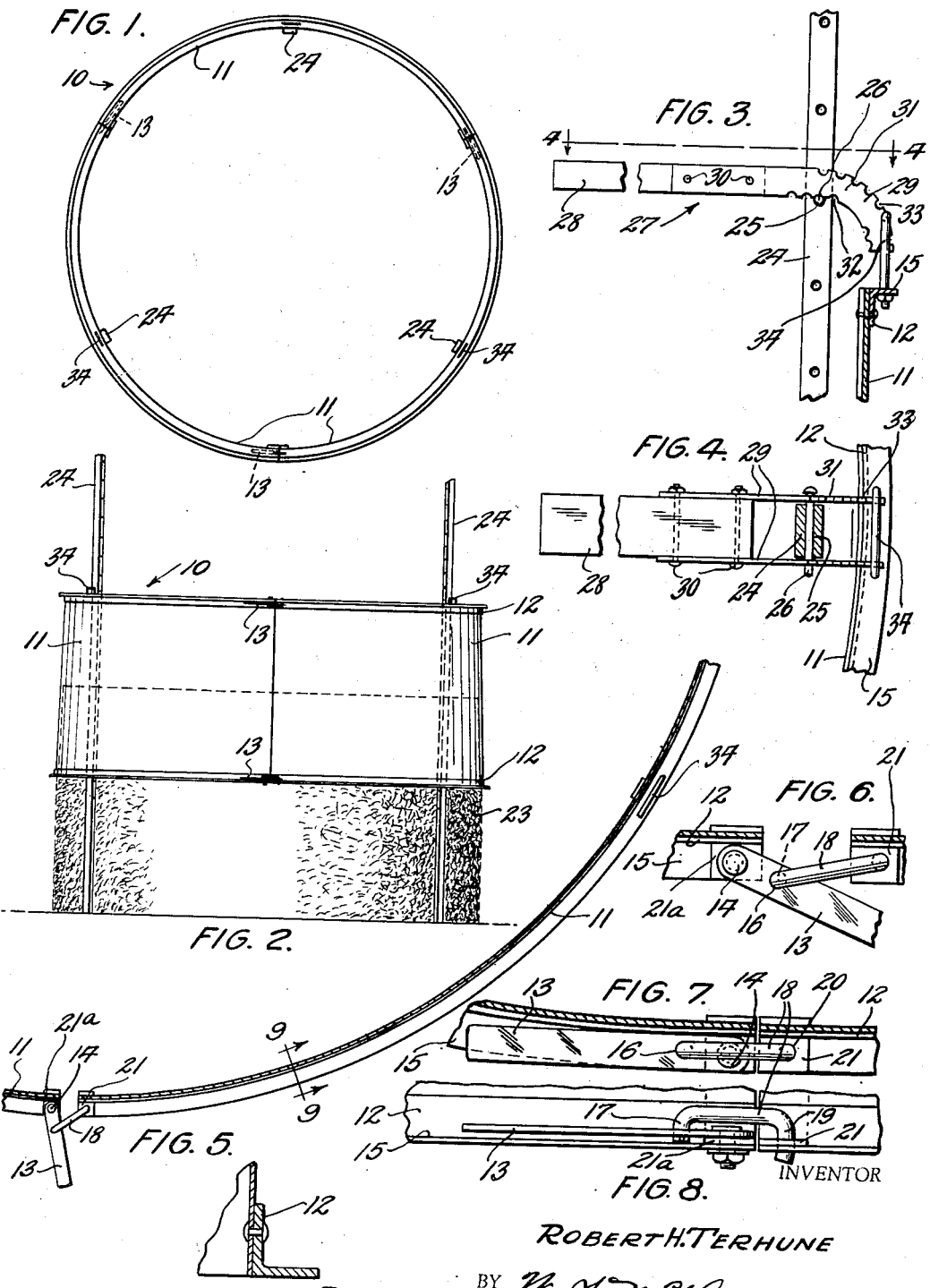
INVENTOR
ROBERT H. TERHUNE
BY
ATTORNEY Patented May 25, 1954

2,679,250

UNITED STATES PATENT OFFICE 2,679,250

STACKING DEVICE FOR PILING FARM CROPS

Robert H. Terhune, Washington Court House, Ohio

Application August 1, 1952, Serial No. 302,030

4 Claims. (Cl. 130—20)

The present invention is concerned with an improved manually operating stacking apparatus by which leguminous, and other field crop-producing ensilage may be stacked and formed into columns possessing a compact, orderly shaped and self-supporting formation.

The storage of ensilage often presents a difficult problem. Silo capacity is generally inadequate to provide for the storage of a full crop, and to add to such capacity by the erection of permanent confining walls is, quite frequently, so costly as to be impracticable. The present invention, therefore, seeks to provide means by which ensilage, or other cut field crops, may be stored in ground-positioned orderly disposed stacks or columns, without involving the use and cost of permanent receiving and confining structures.

In accordance with the present invention, there is provided manually erected apparatus for receiving and stacking loose bulk field crops, whereby to form the same into stable self-sustaining columns, and wherein the apparatus comprises a circular form, open at its top and bottom and into which the ensilage is placed to form a column that at its base rests on the ground, the apparatus further including means whereby as the form becomes filled to its volumetric capacity with the ensilage, the form is incrementally raised to various positions or planes of operation above the ground. Additionally, the frame is securely supported in such raised positions above the ground to receive fresh quantities of the field crops or ensilage, whereby to stack the latter and form therefrom well-shaped columns of the ensilage, which columns are of desired height and are stable and self-supporting, so that when the desired height of an ensilage column or stack is reached, the form may be removed therefrom and used in the formation of other stacks or columns, leaving the originally formed stack or column standing unaided on the ground.

Among the objects of the invention are: to provide a stacking form which is light in weight and is capable of being raised and lowered, adjusted and otherwise handled by one man; to provide a form composed of a plurality of arcuate or segmental sections, and wherein improved means are provided for detachably connecting these sections at their ends to produce a composite circular form; to provide internal supporting means arranged within the form, and wherein the supporting means serve to maintain said form in desired positions of vertical adjustment above the ground; to provide a form of this character which decreases in diameter from the bottom thereof to the top, whereby to facilitate raising of the form as filling thereof progresses; to provide a lightweight circular form for use in erecting self-supporting circular columns of legume or other hay silage by successive partial fillings of the form with silage, the form having sufficient rigidity and tensile strength for receiving and adsorbing the internal pressures or forces applied thereto by the internally positioned field crops; and to provide apparatus of this character which constitutes an improvement generally for use in fulfilling the purposes and capacities set forth.

With these and other objects in view, which will appear as the description proceeds, the invention accordingly consists in the novel features of construction, combinations of elements, and arrangements of parts, hereinafter more fully described and pointed out in the appended claims.

In the accompanying drawings, forming a part of this specification, and in which similar characters of reference denote like and corresponding parts throughout the several views thereof:

Fig. 1 is a top plan view of a hay-stacking device formed in accordance with the present invention;

Fig. 2 is a side elevational view thereof;

Fig. 3 is an enlarged detail vertical sectional view disclosing the internal frame means for effecting the support of the circular form of the apparatus in various positions of vertical adjustment thereof;

Fig. 4 is a detail horizontal sectional view taken on the line 4—4 of Fig. 3;

Fig. 5 is an enlarged detail plan view of the form segments;

Fig. 6 is a fragmentary plan view on a larger scale disclosing the lever-actuated means for drawing the adjacent ends of the form segments together, the ends being shown as separated;

Fig. 7 is a similar view, disclosing the lever-actuated locking mechanism when the adjacent ends of a pair of formed segments are disposed in joined order;

Fig. 8 is a fragmentary plan view of the apparatus set forth in Fig. 7;

Fig. 9 is an enlarged vertical transverse sectional view taken on the line 9—9 of Fig. 5.

Referring more particularly to the drawings, the numeral 10 designates my improved stacking form in its entirety. In this instance, the form is constructed to include a plurality of arcuate sections, shown at 11, which, when united along their adjoining vertical edges, produce the complete circular form, the latter being open at its top and at its bottom. Preferably, the completed form tapers upwardly from a base region of maximum diameter to an upper edge region of minimum diameter, as shown in Fig. 2. While the sections may be formed from any suitable material, such as galvanized sheet metal, aluminum, plywood, and various other materials, I prefer to employ a lightweight material, so that the various sections of the form may be manipulated by a single operator. Therefore, any material having the necessary rigidity combined with lightness in weight may be used.

To assist in this condition, I improve the strength and rigidity of said sections by providing each of the same at its upper and lower edges with reinforcing members 12, which may be of angle iron construction. When these reinforcing members are used the body portion of each section may be comparatively thin and light in weight.

To secure the sections together in circle-producing order, there is mounted on the angle members 12, at one end of each section, a pair of vertically aligned lever arms 13, the latter being pivoted as at 14 on the horizontal flanges 15 of said reinforcing members. In this instance, each of the lever arms is formed near its fulcrum point with an opening 16 which receives the downturned end 17 of the link indicated at 18. Each of these links is provided with a downturned end 19 of greater length than the companion end 17, the end 19 extending through an opening 20 formed in a reinforcing plate 21 and in the flange 15 of the associated angle iron, or other similar reinforcing member. Likewise, a plate 21a is used in effecting the pivotal support of each of the lever arms 13. The plate 21a and the underlying flange 15 are formed with openings for the reception of the pivot bolts 14, the lower threaded ends of the latter being equipped with nuts 22. The downturned ends 19 of the links 18 at their extreme lower ends are slightly bent to prevent their withdrawal from their normal pivoted engagement with the plates 21 and the angle-iron flanges 15.

By grasping the outer or free ends of the lever arms 13, the latter may be swung readily to assume the positions depicted in Fig. 6, in which the adjoining vertical edge portions of a pair of united form sections are separated and expanded in relatively spaced order. However, by swinging the lever arms about their fulcrums 14 from the position of Fig. 6 to position of Fig. 7, the form sections are drawn together and circumferentially contracted, so that their vertical edges are drawn together. In the operation, the links 18 may be placed under tension by being moved sufficiently past the centers afforded by the bolts 14 so that the levers are held adjacent the form and in section-joining order.

When the form is first used in the formation of a stack, it is placed directly on the ground. It is then filled with the chopped or cut ensilage to its maximum holding capacity. This is usually done by a power-driven conveyor, not shown. Then in order to permit of the raising of the form to an elevated plane above the ground, so that additional ensilage may be positioned therein, and to increase the height of the ensilage stack or column, indicated at 23, there is placed within the form a plurality of vertically disposed and circularly spaced frames or standards 24, which are used in supporting the form when the latter is raised above the ground.

To effectuate this purpose each of the standards includes a plurality of horizontally extending vertically spaced openings 25, the latter being each adapted to receive a removable cross pin 26, the ends of which project beyond the sides of the standards, as shown in Figs. 3 and 4.

With the cross pin of each standard in position, the form may be elevated through the use of raising appliances, shown at 27. Each appliance in this instance comprises, advantageously, a handle 28 which is positioned to extend inwardly and radially of the form. The outer end of the handle carries a pair of metallic straps 29, which are bolted, as at 30, to the outer or forward end of each handle. The straps include arcuate outer ends 31, which have their inner or under edges formed with a plurality of notches 32, and their curved outer edges with similar notches 33. The latter notches are adapted to receive inverted U-shaped stirrups 34 which are bolted or otherwise secured to the horizontal flanges 15 of the upper reinforcing angle members 12.

It will be seen that when the raising appliances 27 are positioned, as shown in Figs. 3 and 4, the same may be rocked on their pivots 26 by an operator standing within the interior of the form on the silage. Depressing the inner ends of the handles 28 downwardly causes the oscillation of the appliances about the cross pins 26, applying lifting forces to the form so that the same may be raised on the stack to a desired height. When this height has been attained the adjusted position of the form is retained by the actuation of the locking levers or arms 13, which when the sections 11 are drawn together thereby and contracting circumferentially the sections of said form, set up frictional forces which hold the form in its adjusted position on the stack or column 23 above the ground line.

It will be further observed that the apparatus is freely portable, so that after an ensilage stack of desired height has been produced, the apparatus may be removed from the stack and transferred to another place of use. The stacks formed by the apparatus are of an orderly, cylindrical, self-supporting type, having a relatively wide base area so that the stacks are stable and are not apt to tilt over on their sides. The apparatus avoids or minimizes the use and expense of silos, granaries and other permanent structures heretofore employed in the confining of ensilage, or the like.

I claim:

1. Apparatus for stacking farm crops comprising: a circular form open at its top and bottom, said form including a plurality of relatively separable arcuate sections, lever actuated fastening means permanently carried by the separable ends of said sections for contracting circumferentially and securing the latter together in circular form-producing order, vertical ground positioned supports arranged adjacent to said form, and vertically adjustable means connecting said form with said supports for effecting manually executed elevation thereof to higher working levels as the form is filled with stack-producing materials.

2. A form for stacking farm crops comprising: a substantially circular body open at its top and bottom and composed of a plurality of arcuate sections; lever means pivotally carried by said sections for swinging movement in horizontal planes; link means uniting the ends of said sections with said lever means, the arrangement of said lever and link means being such that when the same occupy closed positions, lying adjacent to said sections, the adjacent ends of the latter are drawn together; and manually operated supporting means for elevating the form to higher working levels as the same is filled.

3. Apparatus for stacking farm crops and the like, comprising: a circular stack-shaping form open at its top and bottom, said form including a plurality of arcuate sections detachably united at their ends; reinforcing members secured to the upper and lower edges of said form sections; lever-actuated link means carried by said reinforcing members and joined with the ends thereof in a manner expanding and contracting said sections circumferentially; vertical ground-positioned supports arranged adjacent said form, and manually operated means carried by said support to assume various vertical positions of operation thereon, said last-named means serving to move said form to a higher working level as the form is filled with stack-producing materials.

4. Manually operated apparatus for stacking farm crops, comprising: a plurality of arcuate plates adapted to be assembled into the form of a rigid annulus; fastening means permanently carried by the ends of said plates on the outside thereof for uniting said plates through circumferential contraction thereof in ring-forming relative order; upwardly extending lever fulcruming posts having their lower ends positioned on the ground and extending upwardly at spaced intervals within the plate-forming annulus; lever means adapted to be adjustably fulcrumed on said posts at various working positions throughout the height thereof, said lever means when so fulcrumed extending inwardly and radially of the plate annulus over the open top thereof; and means carried by the upper edge portion of said annulus cooperative with said lever means to produce elevation of the annulus as the interior of the latter is filled with crop materials.

References Cited in the file of this patent
UNITED STATES PATENTS

| Number | Name | Date |
|---|---|---|
| 670,314 | Dunkel | Mar. 19, 1901 |
| 1,430,761 | Sheets | Oct. 3, 1922 |
| 2,648,945 | Harrington | Aug. 18, 1953 |